United States Patent Office 3,415,607
Patented Dec. 10, 1968

3,415,607
HAIR DYE COMPOSITION CONTAINING
2-HYDROXY-1,4-NAPHTHOQUINONE
Stanley Brechner, West Orange, and Kathleen De Vito, Union, N.J., assignors to Warner-Lambert Pharmaceutical Company, Morris Plains, N.J., a corporation of Delaware
No Drawing. Filed Mar. 1, 1965, Ser. No. 436,267
1 Claim. (Cl. 8—10.2)

ABSTRACT OF THE DISCLOSURE

A hair dye prepared by reacting a naphthoquinone with a mono-lower alkanol amine.

---

This invention relates to certain cosmetic compositions capable of imparting color to keratinous fibers and more particularly to new and novel dyes employed in such compositions.

Numerous compositions capable of imparting color to keratinous fibers have been developed. However, these various compositions are typically characterized by inherent disadvantages such as fading off-color in sunlight, staining of skin as well as possible toxic effects, the latter of which is especially characteristic of the oxidation type dyes.

It has now been found, however, that new dyes may be prepared by reacting selected naphthoquinones with particular amines to form dyes useful for imparting color to keratinous fibers.

It is an object of this invention, therefore, to provide a new class of dyes prepared by reacting selected naphthoquinones with particular amines for use in imparting color to keratinous fibers.

It is also an object of this invention to provide compositions containing new dyes particularly adapted to impart color to keratinous fibers.

It is a further object of this invention to provide new, stable dyes and compositions containing such dyes for use in coloring human hair.

Other objects and advantages will become more apparent from the following detailed description.

According to the present invention, new dyes are prepared by reacting selected naphthoquinones with particular amines to form useful red, brown, green, and blue dyes of unestablished constitution useful for coloring keratinous fibers such as animal and human hair.

The present dyes may be prepared by simple reaction of a naphthoquinone such as 2-hydroxy-1,4-naphthoquinone (lawsone), 5-hydroxy-1,4-naphthoquinone (juglone) and 1,4-naphthoquinone with suitable mono-lower alkanol amines such as, for example, monomethanolamine, monoethanolamine, monoisopropanolamine and the like. The condensation product so formed is found to be particularly advantageous in coloring keratinous fibers while possessing high stability in hair coloring compositions. These hair coloring compositions may be in the form of any desirable carrier such as foam for optimum distribution, spray, liquid, paste or the like. It has also been found that the present dyes may be blended in a hair coloring composition, if desired, to provide various shades and tints.

The amount of dye which has been found satisfactory for use in hair coloring compositions falls within the range of about 0.005% to about 2.5% by weight of the final composition which may include typical components known to the art.

In order to more fully illustrate the present invention, the following examples are included:

Example 1

The dye prepared in the composition set forth below is found to be capable of imparting a blue color to the hair:

| Ingredient: | Parts by weight, percent |
|---|---|
| Lawsone | 0.50 |
| Monoethanolamine | 2.04 |
| Denatured alcohol (S.D.A. #40) | 1.63 |
| Benzyl alcohol | 5.20 |
| Ammonium lauryl sulfate (Sipon L-22 by Alcolac Chemical Corp.) | 0.15 |
| Hydroxyethyl cellulose (Natrosol 250-HR by Hercules Powder Corp.) | 1.00 |
| Water, Q.s to 100.00. | |

Example 2

The dye prepared in the composition set forth below is found to be capable of imparting a red color to the hair:

| Ingredient: | Parts by weight, percent |
|---|---|
| Lawsone | 8.20 |
| Monoethanolamine | 9.84 |
| Glacial acetic acid | 65.60 |
| Water to make | 100.00 |

Example 3

The dye prepared in the composition set forth below is found to be capable of imparting a greenish-blue color to the hair:

| Ingredient: | Parts by weight, percent |
|---|---|
| Lawsone | 8.80 |
| Monoethanolamine | 3.21 |
| Water to make | 100.00 |

Example 4

The dye prepared in the composition set forth below is found to be capable of imparting a blue color to the hair:

| Ingredient: | Parts by weight, percent |
|---|---|
| Lawsone | 8.09 |
| Monomethylamine | 4.36 |
| Water to make | 100.00 |

Example 5

The dye prepared in the composition set forth below is found to be capable of imparting a blue-green color to the hair:

| Ingredient: | Parts by weight, percent |
|---|---|
| Lawsone | 6.13 |
| Monoethanolamine | 6.13 |
| Ethylene glycol monoethyl ether (Cellosolve by Union Carbide Chemical Co.) | 85.90 |
| Pyridine | 1.84 |

Example 6

The dye prepared in the composition set forth below is found to be capable of imparting a brown color to the hair:

| Ingredient: | Parts by weight, percent |
|---|---|
| Lawsone | 5.87 |
| Monoisopropanolamine | 5.58 |
| Sodium hydroxide | 0.59 |
| Water to make | 100.00 |

Example 7

The dye prepared in the composition set forth below is found to be capable of imparting a brown color to the hair:

| Ingredient: | Parts by weight, percent |
|---|---|
| Monoethanolamine | 7.94 |
| 1,4-naphthoquinone | 11.10 |
| Ethylene glycol monoethyl ether (Cellosolve by Union Carbide Chemical Co.) | 76.20 |
| Pyridine | 4.76 |

The novel hair coloring compositions of the present invention are adapted for convenient home use by the consumer. Prior to using any one of these compositions the hair preferably is given a thorough cleansing treatment by washing with a good quality non-soap shampoo. After substantially all dirt, grease and the like has been removed a lustrous new hair color may be obtained upon a single application of the composition herein described.

The addition of various adjuvant materials to the novel hair coloring compositions is contemplated by the present invention. Thus, the compositions ordinarily will contain a perfume which should be selected so as to be compatible with the character of the finished product. Also, the ingredients which impart further desired qualities to the hair may be incorporated in the present compositions. Hair conditioners, for example, or superfatting materials or foam boosters such as lanolin, lecithin, fatty amides, etc., generally may be used in minor proportions. Furthermore, small amounts of thickening agents such as sodium alginate may be included to reduce the fluidity of the product. Moreover, suitable preservatives may be incorporated in minor amounts as need to prevent or substantially minimize the formation of mold.

It is to be understood that the foregoing detailed description is given merely by way of illustration and that many variations may be made therein without departing from the spirit of this invention.

What is claimed is:

1. A dye composition capable of imparting a greenish-blue color to the hair which comprises,

| Ingredient: | Approximate parts by weight, percent |
|---|---|
| 2-hydroxy-4-naphthoquinone | 8.80 |
| Monoethanolamine | 3.21 |
| Water to make | 100.00 |

References Cited

UNITED STATES PATENTS

| | | | |
|---|---|---|---|
| 1,759,273 | 5/1930 | Nawiasky et al. | 260—396 |
| 2,745,788 | 5/1956 | Frohnsdorff et al. | 167—88 |
| 3,041,244 | 6/1962 | Feit et al. | 167—88 |
| 3,092,555 | 6/1963 | Horn | 167—88 |
| 3,114,755 | 12/1963 | Covey | 260—396 |
| 3,147,288 | 9/1964 | Frohnsdorff | 167—88 X |
| 3,251,744 | 5/1966 | Brunner | 167—88 |

FOREIGN PATENTS

| | | |
|---|---|---|
| 304,804 | 1/1929 | Great Britain. |
| 826,479 | 1/1960 | Great Britain. |
| 919,824 | 2/1963 | Great Britain. |
| 1,138,955 | 2/1957 | France. |

ALBERT T. MEYERS, *Primary Examiner.*

V. C. CLARKE, *Assistant Examiner.*

U.S. Cl. X.R.

8—10, 11